US010531247B2

(12) United States Patent
Kashef (10) Patent No.: US 10,531,247 B2
(45) Date of Patent: Jan. 7, 2020

(54) INTERNET-OF-THINGS DEVICES AND RELATED METHODS FOR PERFORMING IN-CALL INTERACTIONS

(71) Applicant: Libre Wireless Technologies, Inc., Irvine, CA (US)

(72) Inventor: Hooman Kashef, Coto de Caza, CA (US)

(73) Assignee: LIBRE WIRELESS TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/788,642

(22) Filed: Oct. 19, 2017

(65) Prior Publication Data
US 2019/0124482 A1   Apr. 25, 2019

(51) Int. Cl.
*H04B 1/38*    (2015.01)
*H04W 4/16*    (2009.01)
*H04L 29/06*   (2006.01)
*H04L 29/08*   (2006.01)
*H04W 4/70*    (2018.01)
*H04W 4/80*    (2018.01)

(52) U.S. Cl.
CPC .......... *H04W 4/16* (2013.01); *H04L 65/1069* (2013.01); *H04L 67/12* (2013.01); *H04W 4/70* (2018.02); *H04W 4/80* (2018.02)

(58) Field of Classification Search
CPC .......... H04L 67/10; H04L 63/10; H04W 4/70; H04W 4/80; H04W 84/12; H04W 84/18
USPC ................................. 455/414.1–417
See application file for complete search history.

(56) References Cited

U.S. PATENT DOCUMENTS

| 8,428,654 B2* | 4/2013 | Oh ..................... H04M 1/72583 455/414.1 |
| 2006/0227964 A1* | 10/2006 | Gierach ................ H04M 3/002 379/406.01 |
| 2008/0058023 A1 | 3/2008 | Seshadri |
| 2009/0132256 A1 | 5/2009 | Geldbach |
| 2015/0006695 A1* | 1/2015 | Gupta ..................... H04L 41/32 709/223 |

* cited by examiner

*Primary Examiner* — Ronald Eisner
(74) *Attorney, Agent, or Firm* — Metis IP LLC (57) ABSTRACT

A miniaturized multiprotocol audio/voice internet-of-things device (MAVID) initiates a wireless call in response to a command received from a first user. The MAVID carries out the wireless call between the first user and a second user. The wireless call utilizes wireless protocols such as WiFi, Bluetooth, third generation mobile technology (3G), fourth generation mobile technology (4G), and Digital Enhanced Cordless Telecommunications (DECT). The MAVID performs an in-call interaction, such as connecting to and utilizing an internet-based application or controlling a consumer electronic device, in response to a voice command from either the first user or the second user, while carrying out the wireless call.

9 Claims, 7 Drawing Sheets

INTERNET-OF-THINGS DEVICES AND RELATED METHODS FOR PERFORMING IN-CALL INTERACTIONS

RELATED APPLICATION(S)

The present application is related to U.S. patent application Ser. No. 15/788,201 filed on Oct. 19, 2017, and presently titled "Multiprotocol Audio/Voice Internet-Of-Things Devices and Related System." The disclosure in this related application is hereby incorporated fully by reference into the present application.

BACKGROUND

The internet-of-things (IoT) refers to the networking of physical objects embedded with electronic devices. As more objects are networked, new ways of interacting with them become available. IoT devices can collect, process, act on, and communicate data for such purposes as automation, user reporting, and remote control. IoT devices are rapidly being deployed in home, industrial, metropolitan, and environmental applications.

IoT devices communicate using numerous wireless protocols, including WiFi, Bluetooth, ZigBee, and more. Manufacturers of different IoT devices may use any one of these numerous wireless protocols. The existence of numerous wireless protocols hinders communicating with IoT devices having different wireless protocols, and is commonly referred to as the "basket of remotes" problem.

In addition, many IoT devices use voice control for ease of use. However, present IoT devices are typically not engaged to initiate and carry out live voice calls between remote users, including voice over Internet protocol (VoIP), cellular, and landline calls. Users often rely on other devices and software for initiating and carrying out voice calls. As a result, many ways of interacting with ToT devices based on live voice calls have not been explored.

SUMMARY

The present disclosure is directed to Internet-of-things (IoT) devices and related methods for performing in-call interactions, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
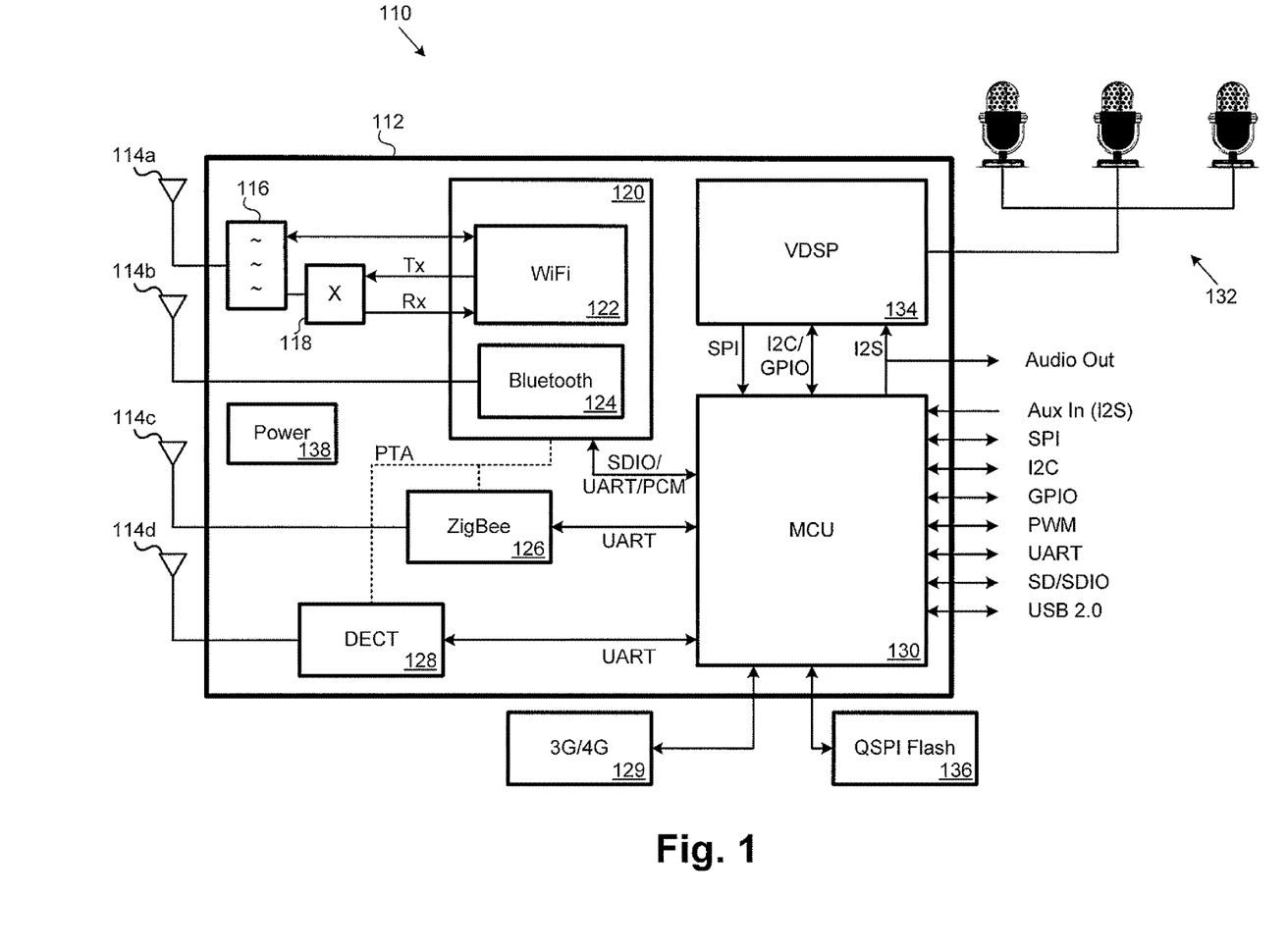
FIG. 1 illustrates a system diagram of a portion of an exemplary multiprotocol audio/voice internet-of-things device (MAVID) according to one implementation of the present application.

FIG. 1 illustrates a system diagram of a portion of an exemplary multiprotocol audio/voice internet-of-things device (MAVID) according to one implementation of the present application. As illustrated in FIG. 1, MAVID 110 includes package 112, antennas 114a, 114b, 114c, and 114d, diplexer 116, RF switch 118, dual-band wireless communication module 120, having WiFi communication module 122 and Bluetooth communication module 124, ZigBee communication module 126, Digital Enhanced Cordless Telecommunications (DECT) communication module 128, third generation and fourth generation mobile technology (3G/4G) communication module 129, multipoint control unit (MCU) 130, microphone 132, voice digital signal processor (VDSP) 134, quad serial peripheral interface (QSPI) flash memory 136, and power supply 138.

As shown in FIG. 1, diplexer 116, RF switch 118, dual-band wireless communication module 120, having WiFi communication module 122 and Bluetooth communication module 124, ZigBee communication module 126, DECT communication module 128, MCU 130, VDSP 134, and power supply 138 are located inside package 112. Package 112 may be a small form factor package having dimensions of approximately one inch by inch (1"×1") or less. As also shown in FIG. 1, antennas 114a, 114b, 114c, and 114d, 3G/4G communication module 129, microphone 132, and QSPI flash memory 136 are located outside package 112. Antennas 114a, 114b, 114c, and 114d, 3G/4G communication module 129, microphone 132, and QSPI flash memory 136 may be located, for example, on a printed circuit board (PCB) (not shown in FIG. 1). Package 112 may also be located on the PCB.

Antennas 114a, 114b, 114c, and 114d located outside package 112 are used to receive or transmit RF signals according to various wireless protocols. For example, antennas 114a, 114b, 114c, and 114d are used to receive or transmit RF signals according to the WiFi, Bluetooth, ZigBee, and DECT protocols respectively. The WiFi protocol includes the Institute of Electrical and Electronics Engineers (IEEE) 802.11 standards. For example the WiFi protocol may be IEEE 802.11a, 802.11b, 802.11g, and/or 802.11n standards and use 2.4 GHz and/or 5 GHz frequency bands. The Bluetooth protocol includes versions of the Bluetooth specifications, such as Bluetooth Basic Rate, Bluetooth Enhanced Data Rate (EDR), and/or Bluetooth Low Energy (LE). The Bluetooth protocol may comply with IEEE 802.15.1 standards and use the 2.4 GHz frequency band. The ZigBee protocol includes versions of the ZigBee Alliance specifications, such as ZigBee 2006 and/or ZigBee PRO.

The ZigBee protocol may comply with IEEE 802.15.4 standards and use 868 MHz, 915 MHz, and/or 2.4 GHz frequency bands. The DECT protocol includes versions of the DECT standards, such as DECT Common Interface (CI), DECT Cordless Advanced Technology—internet and quality (CAT-iq), and/or DECT Ultra Low Energy (ULE). The DECT protocol may comply with European Telecommunications Standards Institute (ETSI) EN 300 175, TS 102 527, and/or TS 102 939 standards and use the 1.9 GHz frequency band. Antennas 114a, 114b, 114c, and 114d may be, for example, patch antennas or microstrip antennas or other types of antennas. In one implementation, antennas 114a, 114b, 114c, and 114d may each be an antenna array having more than one element. In one implementation, a single antenna may be used for more than one wireless protocol. For example a single antenna may be used for both WiFi and Bluetooth protocols.

Antenna 114a is coupled to diplexer 116. Diplexer 116 differentiates RF signals in different frequency bands. For example, in the present implementation, diplexer 116 differentiates signals in the 2.4 GHz frequency band from signals in the 5 GHz frequency band. The 2.4 GHz signals are coupled to WiFi communication module 122 in dual band wireless communication module 120. The 5 GHz signals are coupled to RF switch 118, which switches the signals between transmit and receive lines, and are then coupled to WiFi communication module 122 in dual band wireless communication module 120. Antennas 124b, 124c, and 124d are coupled to Bluetooth communication module 124, ZigBee communication module 126, and DECT communication module 128 respectively.

WiFi communication module 122, Bluetooth communication module 124, ZigBee communication module 126, and DECT communication module 128 process RF signals according to the standards of the WiFi protocol, the Bluetooth protocol, the ZigBee protocol, and the DECT protocol respectively. Because concurrent use of multiple wireless protocols generally results in interference and collisions, WiFi communication module 122, Bluetooth communication module 124, ZigBee communication module 126, and DECT communication module 128 are also responsive to and controlled by control signals from MCU 130. As shown in FIG. 1, WiFi communication module 122, Bluetooth communication module 124, ZigBee communication module 126, and DECT communication module 128 are coupled to MCU 130 through hardware communication interfaces, such as secure digital input output (SDIO), universal asynchronous receiver/transmitter (UART), and pulse code modulation (PCM) interfaces. These interfaces are bidirectional, allowing the communication modules to report data to MCU 130 for additional processing, and allowing MCU 130 to send control signals to the communication modules.

For example, WiFi communication module 122, Bluetooth communication module 124, ZigBee communication module 126, and DECT communication module 128 may report information regarding current and planned operational states, bit and packet error rates, signal and noise power levels, frequencies and channels, and timing. MCU 130 may perform interference assessments based on information reported by the communication modules, determine interference solutions based on the interference assessments, and send control signals to the communication modules based on the determined interference solutions. Thus, MCU acts as a packet traffic arbiter (PTA) to manage the coexistence of multiple wireless protocols, enabling MAVID 110 to concurrently form wireless RF communication links over those multiple wireless protocols.

In FIG. 1, 3G/4G communication module 129 is coupled to MCU 130. MCU 130 interacts with 3G/4G communication module 129 in substantially the same manner as the other wireless communication modules described above. 3G/4G communication module 129 may be located outside package 112 for other considerations such as size, heat dissipation, and/or electrical isolation. Optionally, as shown in FIG. 1, dual-band wireless communication module 120, ZigBee communication module 126, and/or DECT communication module 128 are coupled through a PTA interface, to more efficiently compare data from one wireless communication module with data from another wireless communication module and reduce the processing burden of MCU 130. In one implementation, MAVID 110 may form wireless RF communication links over other wireless protocols instead of, or in addition to, those shown in FIG. 1. For example, MAVID 110 may use Long Range (LoRa), Z-Wave, and any other wireless protocols.

As shown in FIG. 1, MAVID 110 includes microphone 132. Microphone 132 is configured to receive voice from a user. In the present implementation, microphone 132 is a microphone array with three microphone elements. Microphone 132 may provide beamforming capability to improve reception of far-field voice and enable voice tracking. In various implementations, microphone 132 may be a single microphone element or a microphone array with more or fewer microphone elements than shown in FIG. 1. The number of microphone elements may depend on how critical sound is for MAVID 110.

Microphone 132 is coupled to VDSP 134. VDSP 134 is configured to receive and process voice signals from microphone 132. VDSP 134 performs voice signal conditioning, such as noise filtration, voice cleanup, and gain control. VDSP 134 also performs voice recognition analysis. In one implementation, VDSP 134 employs a wake-up scheme wherein components of MAVID 110 are kept in a low-power operational state until the occurrence of a detectable event, such as VDSP 134 recognizing a user speaking "Jarvis" or another keyword.

As shown in FIG. 1, VDSP 134 is coupled to MCU 130 through hardware communication interfaces, such serial peripheral interface (SPI), inter-integrated circuit (I2C), general purpose input output (GPIO), and inter-IC sound (I2S) interfaces. These interfaces allow MCU 130 to provide feedback to VDSP 134, and VDSP 134 to provide voice control signals to MCU 130. MCU 130 is configured to enable wireless RF communication links over multiple wireless protocols in response to the voice control signals received from VDSP 134. For example, while MAVID 110 is streaming audio to a speaker (not shown in FIG. 1) over the Bluetooth protocol, a user may speak the words "lights show." VDSP 134 may provide a voice control signal to MCU 130 corresponding to voice recognition of the words "lights show." MCU 130 may process both the voice control signal and information reported by Bluetooth communication module 124, and then enable MAVID 110 to connect to lights (not shown in FIG. 1) over the ZigBee protocol while maintaining the connection to the speaker over the Bluetooth protocol. In other examples, MCU 130 enables MAVID 110 to communicate over multiple wireless protocols in response to voice control signals corresponding to voice recognition of different words.

As also shown in FIG. 1, MAVID 110 includes QSPI flash memory 136 coupled to MCU 130. MCU 130 may process information stored in QSPI flash memory 136, in addition to voice control signals and information reported by wireless communication modules. For example, QSPI flash memory 136 may store a previous multiprotocol connection's configuration, so that MCU 130 can access the configuration and reduce processing burden of MCU 130 upon a similar subsequent multiprotocol connection. Power supply 138 supplies power to components of MAVID 110. MCU 130 may also process information from external hardware communication interfaces such as external inter-IC sound (I2S) (shown as "Aux In (I2S)" in FIG. 1), serial peripheral interface (SPI), inter-integrated circuit (I2C), general purpose input output (GPIO), pulse width modulation (PWM), universal asynchronous receiver transmitter (UART), secure digital/secure digital input output (SD/SDIO), and/or universal serial bus (USB) interfaces. One of the external hardware communication interfaces (shown as "Audio Out" in FIG. 1) enables MCU 130 to communicate with at least one speaker (not shown in FIG. 1). The speaker may be external to MAVID 110 or integrated with MAVID 110.

MCU 130 can initiate a wireless call in response to a user command. In one example, a user command may be a voice command such as a voice command received from microphone 132. In another example, a user command may be a non-voice command such as an input received from hardware communication interfaces after a user pushes a button on an input panel. After MCU 130 receives a user command, MCU 130 initiates a wireless call over wireless RF communication links as discussed above. For example, MCU 130 can initiate VoIP, landline, and cellular calls over the WiFi, DECT, and 3G/4G protocols respectively by connecting to a router, cordless phone dock, or base station respectively. Once initiated, MCU 130 can carry out the wireless call over the respective wireless protocol. For example, microphone 132 can receive voice signals and MCU 130 can transmit corresponding audio signals through antennas 114a, 114b, 114c, and 114d, and antennas 114a, 114b, 114c, and 114d can receive audio signals and MCU 130 can transmit corresponding audio signals to a speaker through the "Audio Out" interface shown in FIG. 1. As used herein, the phrase "wireless call" refers to the wireless exchange of audio signals between MAVID 110 and the next link in the call chain; it is not necessary that the entire call chain be wireless.

While in-call, MCU 130 performs in-call interactions in response to voice control signals. Voice control signals can correspond to voice recognition of words or sounds from the MAVID end of the wireless call. For example, MCU 130 may receive voice control signals from VDSP 134 corresponding to voice recognition of words or sounds from a MAVID user received through microphone 132 during the wireless call. Voice control signals can also correspond to voice recognition of words or sounds at another end of the wireless call. For example, MCU 130 may receive voice control signals through any voice recognition over internet protocol (VRoIP) technique corresponding to voice recognition of words or sounds from other users during the wireless call. MCU 130 may process the voice control signals using various algorithms to perform an in-call interaction.

In one implementation, the in-call interaction may be recognition of keyword. For example, MCU 130 may check for a specific keyword among the voice control signals and register that it recognized the keyword. MCU 130 may perform another in-call interaction after registering keyword recognition such as, for example, waking up components of MAVID 110 from a low-power operational state. In one implementation, the in-call interaction may be execution of a request. For example, MCU 130 may delimit the start of a request using a keyword, delimit the end of a request based on time intervals, associate parts of the request with data stored in memory, and execute the request based on the associations. Executing a request may involve connecting to and utilizing an internet-based application, for example, over the WiFi protocol. In another implementation, executing a request may involve controlling a consumer electronic device. A consumer electronic device may be any IoT device integrated with a wireless protocol module, such as a television, a computer, a printer, a flash drive, an on-board diagnostics (OBD) dongle, a refrigerator, a coffee maker, a home security alarm, a security camera, a washer, a dryer, a thermostat, or a heating, ventilation, and air conditioning (HVAC) device. MCU 130 may execute a request utilizing WiFi, ZigBee, Bluetooth, 3G/4G, LoRa, Z-Wave, DECT, and any other wireless protocols as discussed above. In one implementation, the protocol utilized to execute a request may differ from the protocol utilized to initiate or carry out a wireless call. In one implementation, the protocol utilized to execute a request may differ from the protocol utilized to execute another request.

MAVID 110 is a wireless IoT device that enables two-way voice communication between users. The user does not need additional devices and software in order to carry out a voice call on his/her MAVID IoT device. Because MAVID 110 enables multiple wireless protocols, a user can talk to and receive audio from MAVID 110 as though it were a VoIP phone, a cordless phone, and a cellular phone. In addition, while in-call, MAVID 110 performs IoT interactions in response to voice commands. MAVID 110 can perform these in-call interactions where the voice commands originate from users on either end of the call, and where the voice commands involve requests to connect to applications or to control devices having various wireless protocols.

Figure 2:
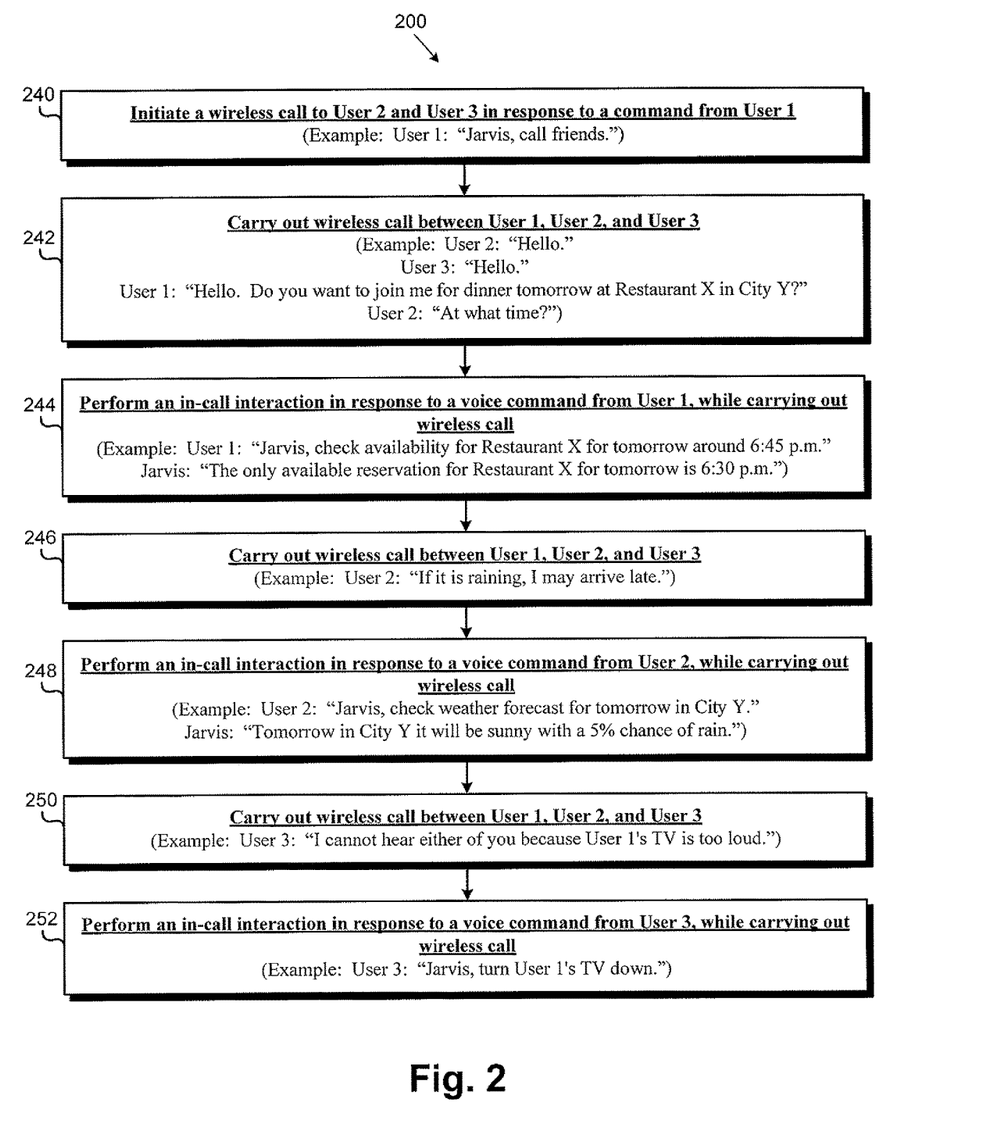
FIG. 2 is a flowchart illustrating an exemplary method executed by a MAVID for performing an in-call interaction according to one implementation of the present application.

FIG. 2 is a flowchart illustrating an exemplary method executed by a MAVID for performing an in-call interaction according to one implementation of the present application. Certain details and features have been left out of flowchart 200 that are apparent to a person of ordinary skill in the art. For example, a step may comprise one or more sub steps or may involve specialized equipment, as is known in the art. While steps 240 through 252 indicated in flowchart 200 are sufficient to describe one implementation disclosed herein, other implementations disclosed herein may use steps different from those shown in flowchart 200.

As illustrated in flowchart 200, step 240 includes initiating a wireless call to User 2 and User 3 in response to a command from User 1. In the present example, User 1 speaks the voice command "Jarvis, call friends." A MAVID, such as MAVID 110 in FIG. 1, initiates the wireless call to Users 2 and User 3 in response to the voice command. The MAVID may be programmed to associate voice control signals corresponding to the word "friends" with User 2 and User 3 prior to step 240 or concurrently with step 240. In other examples, the MAVID may initiate the wireless call in response to a non-voice command. For example, User 1 may push a button on an input panel, and the MAVID may initiate the wireless call in response to the input.

As illustrated in flowchart 200, step 242 includes carrying out the wireless call between User 1, User 2, and User 3. In the present example, User 1, User 2, and User 3 each speak the greeting "Hello." Next, User 1 asks User 2 and User 3 "Do you want to join me for dinner tomorrow at Restaurant X in City Y?" Next, User 2 asks "At what time?" The MAVID transmits audio signals corresponding to the words spoken by User 1 to User 2 and User 3, and receives audio signals corresponding to the words spoken by User 2 and User 3 and transmits it to User 1, for example, using a speaker. The MAVID may also relay audio signals between User 2 and User 3. The MAVID may carry out the wireless call over various wireless protocols, such as over the WiFi, DECT, and 3G/4G protocols, as discussed above.

As illustrated in flowchart 200, step 244 includes performing an in-call interaction in response to a voice command from User 1, while carrying out the wireless call between User 1, User 2, and User 3. In the present example, User 1 speaks the voice command "Jarvis, check availability for Restaurant X for tomorrow around 6:45 p.m." Within the voice command, the word "Jarvis" represents a keyword that the MAVID can recognize and use to perform additional interaction as discussed above. Within the voice command, the words "check availability for Restaurant X for tomorrow around 6:45 p.m." represent a request that the MAVID can recognize and execute. In the present example, while maintaining the call, the MAVID executes the request by connecting to and utilizing internet-based applications, such as internet-based restaurant reservation applications like OpenTable®. In the present example, the MAVID (referred to as "Jarvis" in FIG. 2) also provides feedback confirming that it successfully executed the request by outputting the words "The only available reservation for Restaurant X for tomorrow is 6:30 p.m." In some implementations, the MAVID may provide feedback that it failed to recognize a request, or that it recognized but failed to execute a request.

As illustrated in flowchart 200, step 246 includes carrying out the wireless call between User 1, User 2, and User 3. The MAVID continues carrying out the wireless call in a manner similar to that discussed above with reference to step 242. In the present example, User 2 states "If it is raining, I may arrive late." The MAVID receives audio signals corresponding to the words spoken by User 2 and transmits it to User 1, for example, using a speaker. The MAVID may also relay audio signals between User 2 and User 3.

As illustrated in flowchart 200, step 248 includes performing an in-call interaction in response to a voice command from User 2, while carrying out the wireless call between User 1, User 2, and User 3. In step 248, User 2 who speaks the voice command is a different user than User 1 who initiated the wireless call. User 1 and User 2 may be at opposite ends of the wireless call. The MAVID performs an in-call interaction in a manner similar to that discussed above with reference to step 244. In the present example, User 2 speaks the voice command "Jarvis, check weather forecast for tomorrow in City Y." Within the voice command, the word "Jarvis" represents a keyword that the MAVID can recognize and use to perform additional interaction as discussed above. Within the voice command, the words "check weather forecast for tomorrow in City Y" represent a request that the MAVID can recognize and execute. In the present example, while maintaining the call, the MAVID executes the request by connecting to and utilizing internet-based applications, such as internet-based weather forecast applications like National Weather Service®. In the present example, the MAVID (referred to as "Jarvis" in FIG. 2) also provides feedback confirming that it successfully executed the request by outputting the words "Tomorrow in City Y it will be sunny with a 5% chance of rain."

As illustrated in flowchart 200, step 250 includes carrying out the wireless call between User 1, User 2, and User 3. The MAVID continues carrying out the wireless call in a manner similar to that discussed above with reference to steps 242 and 246. In the present example, User 3 states "I cannot hear either of you because User 1's TV is too loud." The MAVID receives audio signals corresponding to the words spoken by User 3 and transmits it to User 1, for example, using a speaker. The MAVID may also relay audio signals between User 3 and User 2.

As illustrated in flowchart 200, step 252 includes performing an in-call interaction in response to a voice command from User 3, while carrying out the wireless call between User 1, User 2, and User 3. In step 252, User 3 who speaks the voice command is a different user than User 1 who initiated the wireless call. User 1 and User 3 may be at opposite ends of the wireless call. The MAVID performs an in-call interaction in a manner similar to that discussed above with reference to steps 244 and 248. In the present example, User 3 speaks the voice command "Jarvis, turn User 1's TV down." Within the voice command, the "Jarvis" represents a keyword that the MAVID can recognize and use to perform additional interaction as discussed above. Within the voice command, the words "turn User 1's TV down" represent a request that the MAVID can recognize and execute. In the present example, while maintaining the call, the MAVID executes the request by controlling a consumer electronic device, such as WiFi-enabled smart TV. In the present example, the MAVID does not provide feedback confirming that it successfully executed the request, and instead simply lowers the volume on User 1's TV. The MAVID may be programmed to grant User 3 permissions to control User 1's TV prior to step 252 or concurrently with step 252.

Using a MAVID to execute the method illustrated in flowchart 200 enables a user to carry out a voice call on the MAVID without requiring additional devices and software. Moreover, while in-call, users on either end of the call can speak voice commands and the MAVID can respond by connecting to applications or controlling IoT devices having various wireless protocols. Thus the method illustrated in flowchart 200 introduces many ways of interacting with IoT devices based on live voice calls.

Figure 3:
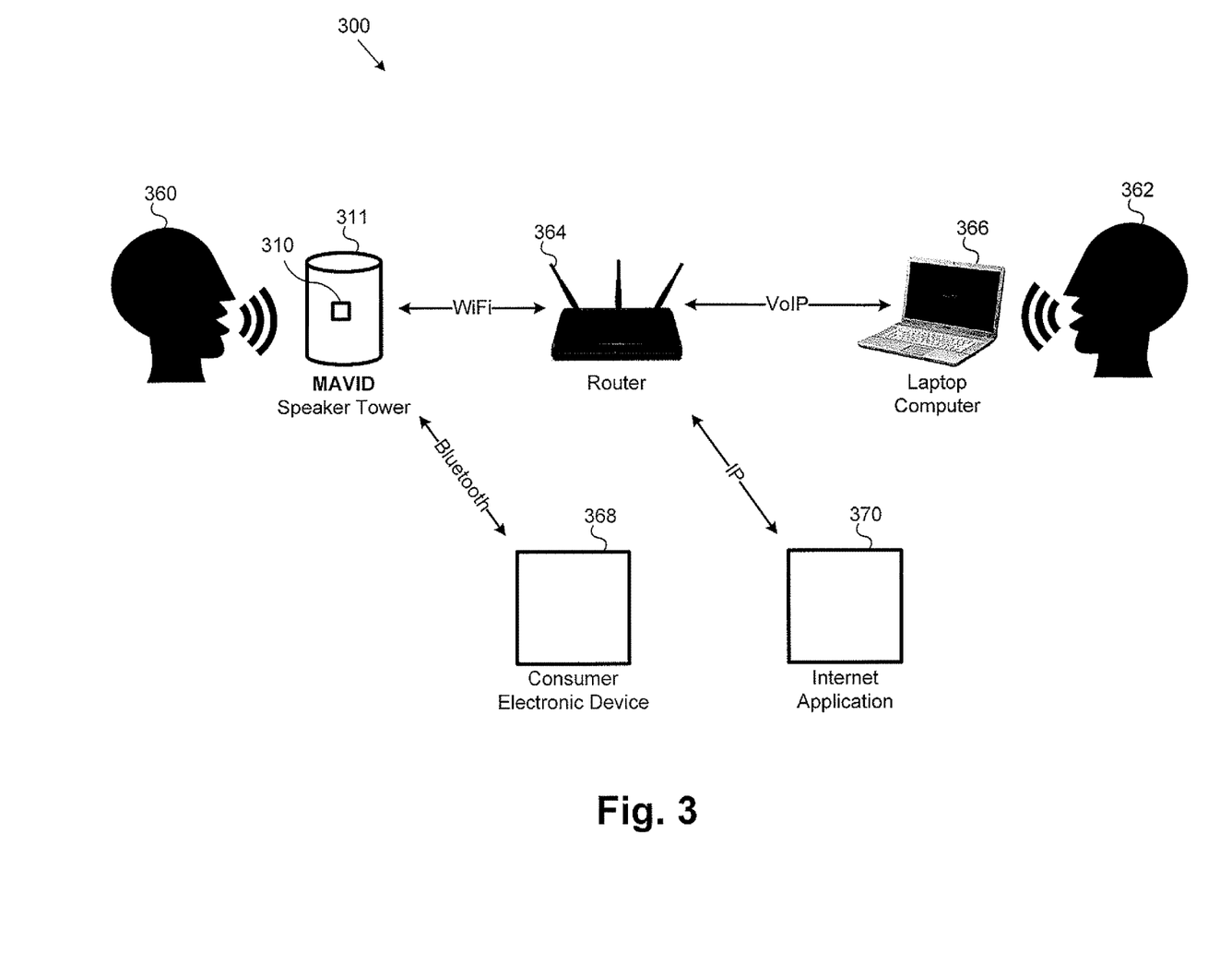
FIG. 3 illustrates an exemplary diagram of a portion of a communication system according to one implementation of the present application.

FIG. 3 illustrates an exemplary diagram of a portion of a communication system according to one implementation of the present application. As illustrated in FIG. 3, communication system 300 includes MAVID 310 within speaker 311, users 360 and 362, router 364, laptop computer 366, consumer electronic device 368, and internet application 370.

In response to a command from user 360, MAVID 310 initiates a wireless call. As shown in FIG. 3, the wireless call utilizes the WiFi protocol. In the present implementation, MAVID 310 is within speaker tower 311 having integrated therein MAVID 310. MAVID 310 in FIG. 3 may have any other implementations and advantages described above with respect to MAVID 110 in FIG. 1. MAVID 310 wirelessly connects to and communicates with router 364 over the WiFi protocol. Router 364 has an integrated WiFi module that enables use of the WiFi protocol. MAVID 310 instructs router 364 to connect to and communicate with laptop computer 366 of user 362 over a VoIP network. MAVID 310 then carries out the call.

Laptop computer 366 may have an integrated microphone and speaker that it uses in conjunction with VoIP software, such as Skype®. Laptop computer 366 receives voice signals from user 362 and transmits corresponding audio signals to MAVID 310, where MAVID 310 outputs the audio signals to speaker 311 for user 360 to hear. Similarly, MAVID 310 receives voice signals from user 360 and transmits corresponding audio signals to laptop computer 366, where laptop computer 366 outputs the audio signals for user 362 to hear. In one implementation, MAVID 310 may carry out a call between more than two users. In one implementation, MAVID 310 may carry out a call having a non-human user. In one implementation, communication system 300 may include multiple MAVIDs, any of which can initiate and carry out a call.

While carrying out the wireless call, MAVID 310 performs an in-call interaction in response to a voice command from either user 360 or 362. As discussed above, the voice command may include a keyword that MAVID 310 can recognize and use to perform additional interaction, and a request that the MAVID 310 can recognize and execute. As shown in FIG. 3, MAVID 310 executes requests by controlling consumer electronic device 368 and utilizing internet application 370. Consumer electronic device 368 may be any IoT device integrated with a wireless protocol module, such as a television, a lighting system, a telephone, a computer, a printer, a flash drive, an on-board diagnostics (OBD) dongle, a refrigerator, a coffee maker, a home security alarm, a security camera, a washer, a dryer, a thermostat, or a heating, ventilation, and air conditioning (HVAC) device. In the present implementation, MAVID 310 controls consumer electronic device 368 over the Bluetooth protocol. In other implementations, MAVID 310 may control consumer electronic device 368 over WiFi, ZigBee, 3G/4G, LoRa, Z-Wave, DECT, or any other wireless protocol. MAVID 310 utilizes internet application 370 by connecting to router 364, and then connecting to internet application 370 over an internet protocol (IP) connection. MAVID 310 may provide feedback regarding execution of a request during the call, as discussed above. In one implementation, communication system 300 may include more than two users, and MAVID 310 may perform an in-call interaction in response to a voice command from any of the users.

Figure 4:
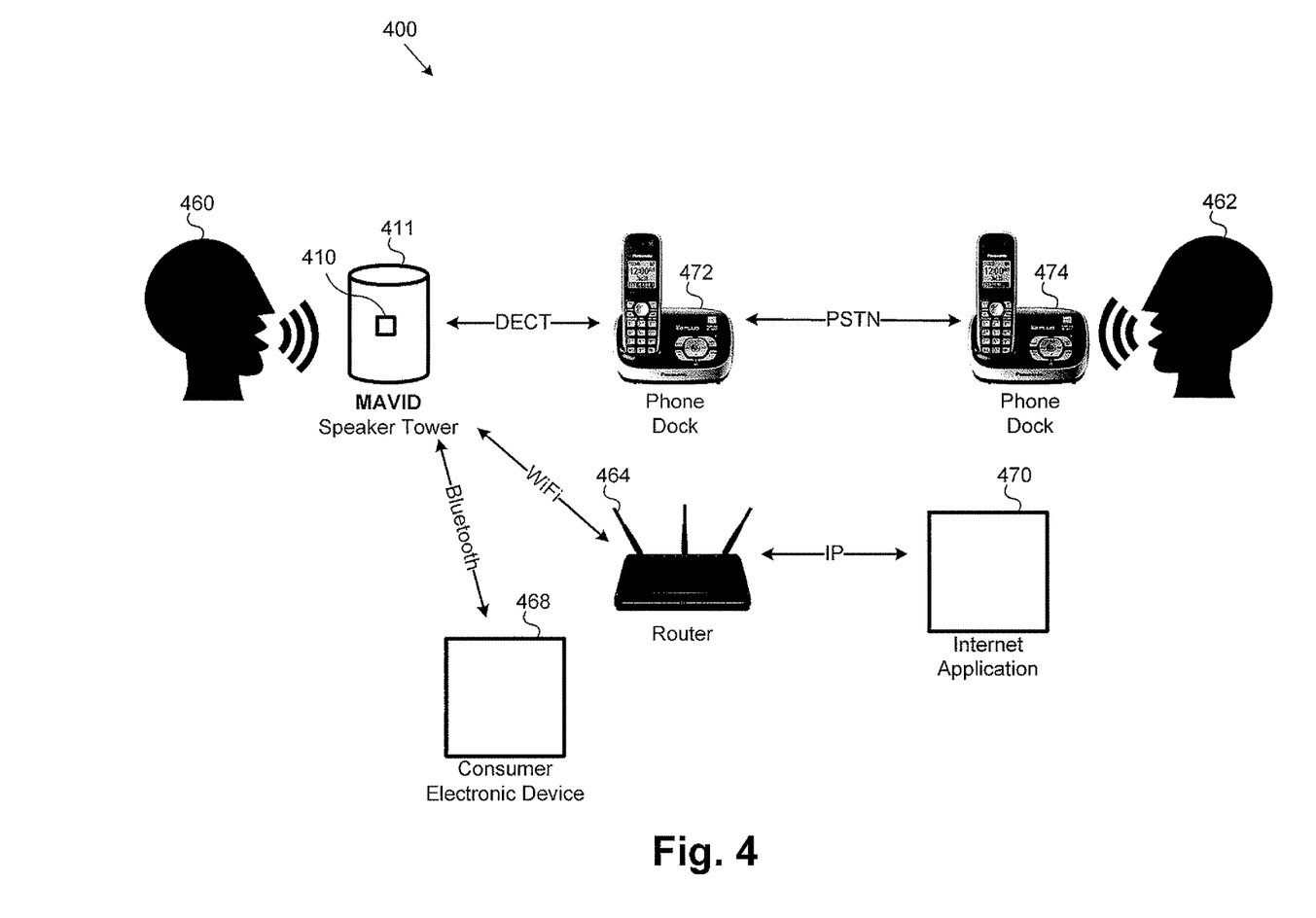
FIG. 4 illustrates an exemplary diagram of a portion of a communication system according to one implementation of the present application.

FIG. 4 illustrates an exemplary diagram of a portion of a communication system according to one implementation of the present application. As illustrated in FIG. 4, communication system 400 includes MAVID 410 within speaker tower 411, users 460 and 462, router 464, consumer electronic device 468, internet application 470, and phone docks 472 and 474.

In response to a command from user 460, MAVID 410 initiates a wireless call. As shown in FIG. 4, the wireless call utilizes the DECT protocol. In the present implementation, MAVID 410 is within speaker 411 having integrated therein MAVID 410. MAVID 410 in FIG. 4 may have any other implementations and advantages described above with respect to MAVID 110 in FIG. 1. MAVID 410 wirelessly connects to and communicates with phone dock 472 over the DECT protocol. Phone dock 472 has an integrated DECT module that enables use of the DECT protocol. MAVID 410 instructs phone dock 472 to connect to and communicate with phone dock 474 of user 462 over a public switched telephone network (PSTN). MAVID 410 then carries out the call. Phone dock 474 may be used in conjunction with a handheld phone having an integrated microphone and speaker. Phone dock 474 receives voice signals from user 462 and transmits corresponding audio signals to MAVID 410, where MAVID 410 outputs the audio signals for user 460 to hear. Similarly, MAVID 410 receives voice signals from user 460 and transmits corresponding audio signals to phone dock 474, where phone dock 474 outputs the audio signals for user 462 to hear. In one implementation, MAVID 410 may carry out a call between more than two users. In one implementation, MAVID 410 may carry out a call having a non-human user. In one implementation, communication system 400 may include multiple MAVIDs, any of which can initiate and carry out a call.

While carrying out the wireless call, MAVID 410 performs an in-call interaction in response to a voice command from either user 460 or 462. As discussed above, the voice command may include a keyword that MAVID 410 can recognize and use to perform additional interaction, and a request that the MAVID 410 can recognize and execute. As shown in FIG. 4, MAVID 410 executes requests by controlling consumer electronic device 468 and utilizing internet application 470. Consumer electronic device 468 may be any IoT device integrated with a wireless protocol module, such as a television, a lighting system, a telephone, a computer, a printer, a flash drive, an on-board diagnostics (OBD) dongle, a refrigerator, a coffee maker, a home security alarm, a security camera, a washer, a dryer, a thermostat, or a heating, ventilation, and air conditioning (HVAC) device. In the present implementation, MAVID 410 controls consumer electronic device 468 over the Bluetooth protocol. In other implementations, MAVID 410 may control consumer electronic device 468 over WiFi, ZigBee, 3G/4G, LoRa, Z-Wave, DECT, or any other wireless protocol. MAVID 410 utilizes internet application 470 by connecting to router 464, and then connecting to internet application 470 over an IP connection. MAVID 410 may provide feedback regarding execution of a request during the call, as discussed above. In one implementation, communication system 400 may include more than two users, and MAVID 410 may perform an in-call interaction in response to a voice command from any of the users.

Figure 5:
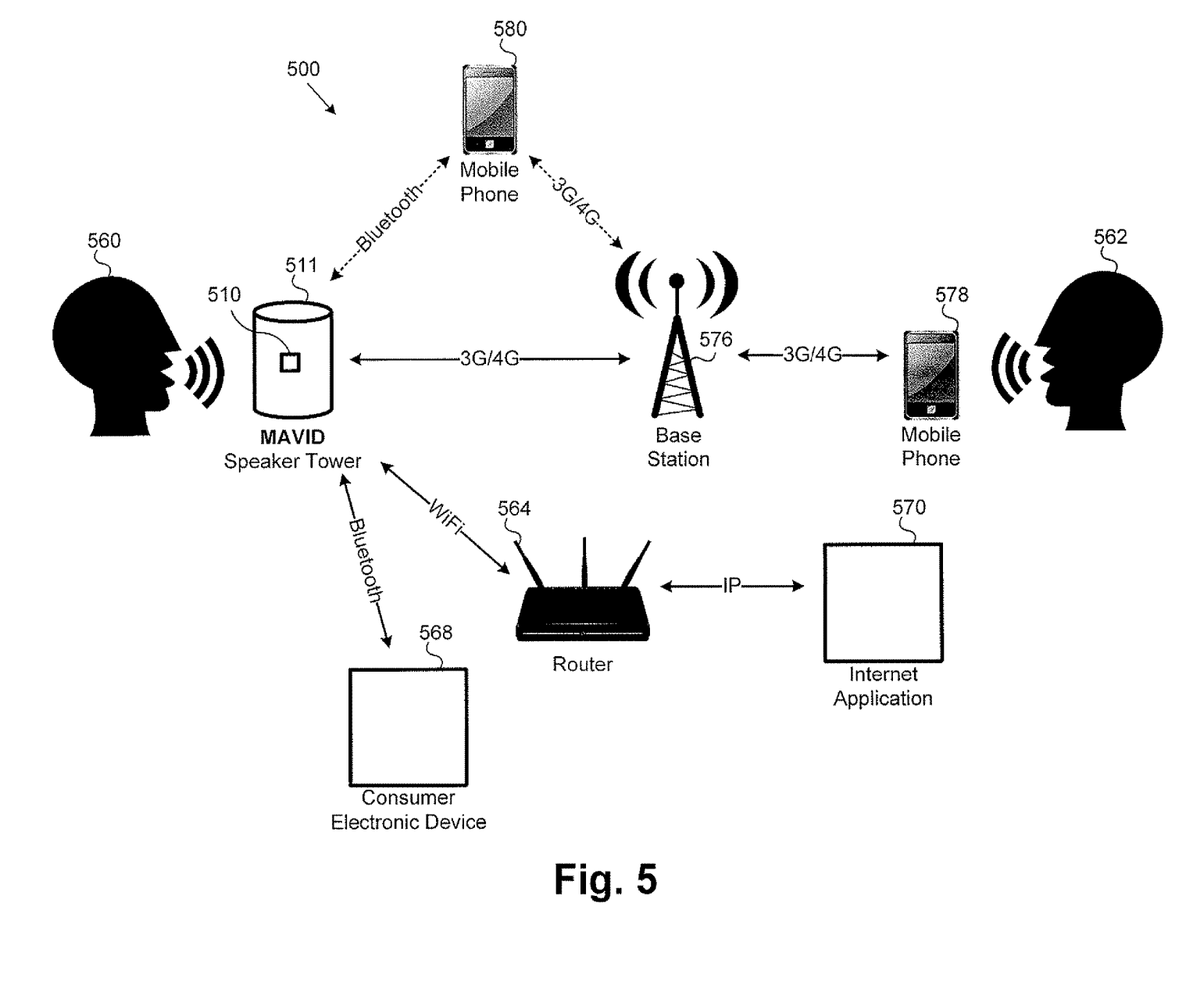
FIG. 5 illustrates an exemplary diagram of a portion of a communication system according to one implementation of the present application.

FIG. 5 illustrates an exemplary diagram of a portion of a communication system according to one implementation of the present application. As illustrated in FIG. 5, communication system 500 includes MAVID 510 within speaker tower 511, users 560 and 562, router 564, consumer electronic device 568, internet application 570, base station 576, mobile phone 578, and optional mobile phone 580.

In response to a command from user 560, MAVID 510 initiates a wireless call. As shown in FIG. 5, the wireless call utilizes the 3G/4G protocols. In the present implementation, MAVID 510 is within speaker 511 having integrated therein MAVID 510. MAVID 510 in FIG. 5 may have any other implementations and advantages described above with respect to MAVID 110 in FIG. 1. MAVID 510 wirelessly connects to and communicates with base station 576 over the 3G/4G protocols. Optionally, MAVID 510 may connect to optional mobile phone 580 over the Bluetooth protocol and then connect to base station 576 over the 3G/4G protocols. In other words, MAVID 510 may use optional mobile phone 580 as a hotspot. Base station 576 enables use of the 3G/4G protocols. MAVID 510 instructs base station 576 to connect to and communicate with mobile phone 578 of user 562 over a 3G/4G network. MAVID 510 then carries out the call. Mobile phone 578 may have an integrated microphone and speaker. Mobile phone 578 receives voice signals from user 562 and transmits corresponding audio signals to MAVID 510, where MAVID 510 outputs the audio signals for user 560 to hear. Similarly, MAVID 510 receives voice signals from user 560 and transmits corresponding audio signals to mobile phone 578, where mobile phone 578 outputs the audio signals for user 562 to hear. In one implementation, MAVID 510 may carry out a call between more than two users. In one implementation, MAVID 510 may carry out a call having a non-human user. In one implementation, communication system 500 may include multiple MAVIDs, any of which can initiate and carry out a call.

While carrying out the wireless call, MAVID 510 performs an in-call interaction in response to a voice command from either user 560 or 562. As discussed above, the voice command may include a keyword that MAVID 510 can recognize and use to perform additional interaction, and a request that the MAVID 510 can recognize and execute. As shown in FIG. 5, MAVID 510 executes requests by controlling consumer electronic device 568 and utilizing internet application 570. Consumer electronic device 568 may be any IoT device integrated with a wireless protocol module, such as a television, a lighting system, a telephone, a computer, a printer, a flash drive, an on-board diagnostics (OBD) dongle, a refrigerator, a coffee maker, a home security alarm, a security camera, a washer, a dryer, a thermostat, or a heating, ventilation, and air conditioning (HVAC) device. In the present implementation, MAVID 510 controls consumer electronic device 568 over the Bluetooth protocol. In other implementations, MAVID 510 may control consumer electronic device 568 over WiFi, ZigBee, 3G/4G, LoRa, Z-Wave, DECT, or any other wireless protocol. MAVID 510 utilizes internet application 570 by connecting to router 564, and then connecting to internet application 570 over an IP connection. MAVID 510 may provide feedback regarding execution of a request during the call, as discussed above. In one implementation, communication system 500 may include more than two users, and MAVID 510 may perform an in-call interaction in response to a voice command from any of the users.

Figure 6:
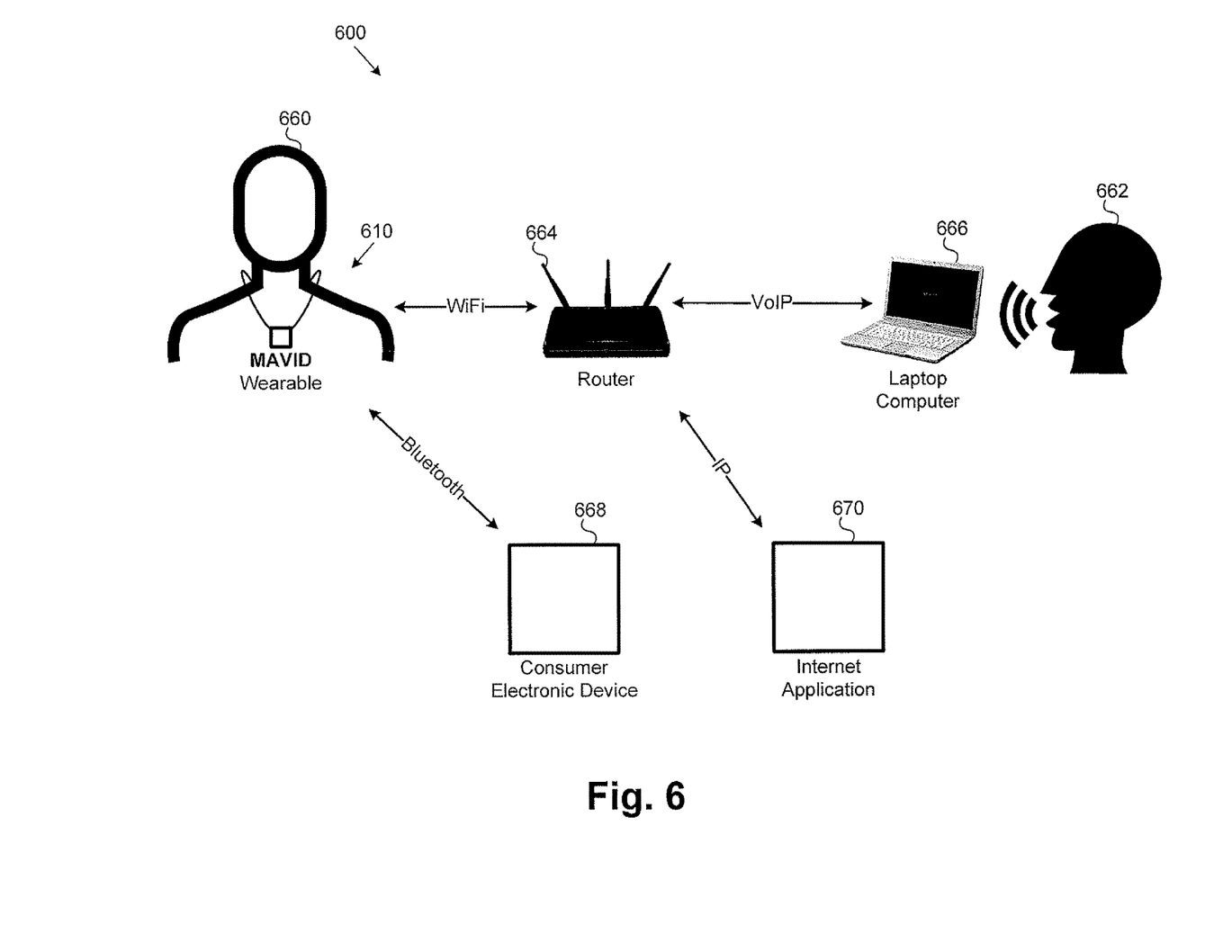
FIG. 6 illustrates an exemplary diagram of a portion of a communication system according to one implementation of the present application.

FIG. 6 illustrates an exemplary diagram of a portion of a communication system according to one implementation of the present application. As illustrated in FIG. 6, communication system 600 includes wearable MAVID 610, users 660 and 662, router 664, laptop computer 666, consumer electronic device 668, and internet application 670. In FIG. 6, communication system 600 includes a wearable MAVID 610, rather than a speaker tower MAVID—as was the case with respect to FIG. 3. Because a MAVID forms RF communication links wirelessly and contains several essential components in a small form factor package, a MAVID can easily be formed as wearable MAVID 610 so that user 660 can conveniently reposition and bring the MAVID along with him. Wearable MAVID 610 may be any MAVID ergonomically designed to be worn by a user without creating a substantial obstruction. In the present implementation, wearable MAVID 610 is a necklace. In various implementations wearable MAVID 610 may be, for example, a button, a watch, eyeglasses, headphones, or an earpiece. Wearable MAVID 610 in FIG. 6 may have any other implementations and advantages described above with respect to MAVID 110 in FIG. 1. Communication system 600 in FIG. 6 may have any other implementations and advantages described above with respect to communication system 300 in FIG. 3.

Figure 7:
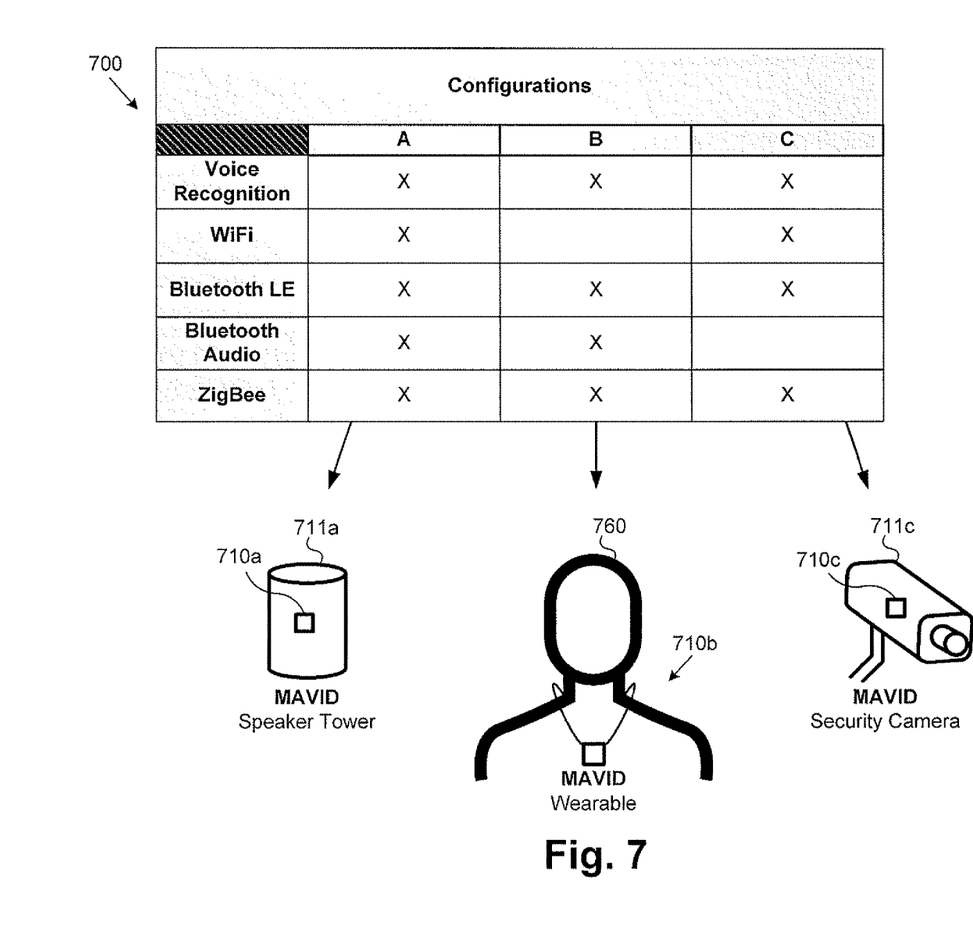
FIG. 7 illustrates a configurations chart of exemplary MAVIDs according to various implementations of the present application.

FIG. 7 illustrates a configurations chart of exemplary MAVIDs according to various implementations of the present application. The columns of configurations chart 700 show three different configurations, referred to as configurations A, B, and C. The rows of configurations chart 700 show five different MAVID features, including Voice Recognition, WiFi, Bluetooth LE, Bluetooth Audio, and ZigBee. In various implementations, more or fewer MAVID features may exist. In configurations chart 700, MAVID features available for a given configuration are shown by an "X" mark in the corresponding row. Configuration A is shown to have all MAVID features available. Configuration A may correspond to a target application where a full-feature MAVID is desirable, such as an in-home application. For the purpose of an example only, configuration A corresponds to MAVID 710a, where MAVID 710a is within speaker tower 711a having integrated therein MAVID 710a. Configuration B is shown to have all MAVID features available except for the WiFi feature. The WiFi feature may not be supported, or may supported but temporarily turned off. Configuration B may correspond to a target application where user 760 is regularly out of range of WiFi devices. As another example, configuration B corresponds to MAVID 710b, where MAVID 710b is a wearable MAVID. Configuration C is shown to have all MAVID features available except for the Bluetooth Audio feature. The Bluetooth Audio feature may not be supported, or may supported but temporarily turned off. Configuration C may correspond to a target application where it is unnecessary for a MAVID to transmit audio over Bluetooth. As yet another example, configuration C corresponds to MAVID 710c, where MAVID 710c is within security camera 711c having integrated therein MAVID 710e. MAVID features may be implemented in a modular fashion to facilitate configuring a MAVID for a given target application. An optimized configuration may reduce the manufacturing cost and/or power consumption of the MAVID.

Thus, various implementations of the present application perform voice controlled IoT interactions over multiple wireless protocols while carrying out a wireless call. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A miniaturized multiprotocol audio/voice internet-of-things (IoT) device (MAVID), wherein the MAVID is configured to:
   initiate a wireless call in response to a command received from a first user;
   carry out the wireless call between the first user and a second user; and
   control, while carrying out the wireless call, a first consumer electronic device in response to a first voice command relayed by the wireless call from the first user, and control, while carrying out the wireless call, a second consumer electronic device in response to a second voice command relayed by the wireless call from the second user.

2. The MAVID of claim 1, wherein the first voice command relayed by the wireless call from the first user or the second voice command relayed by the wireless call from the second user comprises execution of a request from either the first user or the second user.

3. The MAVID of claim 2, wherein execution of the request comprises connecting to and utilizing an internet-based application.

4. The MAVID of claim 1, wherein the first consumer electronic device is selected from the group consisting of a speaker, a router, a television, a lighting system, a telephone, a computer, a printer, a flash drive, an on-board diagnostics (OBD) dongle, a refrigerator, a coffee maker, a home security alarm, a security camera, a thermostat, and a heating, ventilation, and air conditioning (HVAC) device.

5. The MAVID of claim 1, wherein the first in voice command relayed by the wireless call from the first user or the second voice command relayed by the wireless call from the second user comprises recognition of a keyword from either the first user or the second user.

6. The MAVID of claim 1, wherein the wireless call utilizes at least one wireless protocol selected from the group consisting of WiFi, Bluetooth, third generation mobile technology (3G), fourth generation mobile technology (4G), and Digital Enhanced Cordless Telecommunications (DECT).

7. The MAVID of claim 1, wherein the MAVID utilizes at least one wireless protocol selected from the group consisting of WiFi, ZigBee, Bluetooth, third generation mobile technology (3G), fourth generation mobile technology (4G), Long Range (LoRa), Z-Wave, and Digital Enhanced Cordless Telecommunications (DECT).

8. The MAVID of claim 1, wherein the MAVID is a wearable MAVID selected from the group consisting of a necklace, a button, a watch, eyeglasses, headphones, and an earpiece.

9. The MAVID of claim 1 wherein the second consumer electronic device is selected from the group consisting of a speaker, a router, a television, a lighting system, a telephone, a computer, a printer, a flash drive, an on-board diagnostics (OBD) dongle, a refrigerator, a coffee maker, a home security alarm, a security camera, a thermostat, and a heating, ventilation, and air conditioning (HVAC) device.

* * * * *